United States Patent
Law et al.

(10) Patent No.: US 10,569,716 B1
(45) Date of Patent: Feb. 25, 2020

(54) GOLF BAG RETENTION DEVICE

(71) Applicants: David M. Law, Highland, MI (US); Michael J. Giroux, Highland, MI (US)

(72) Inventors: David M. Law, Highland, MI (US); Michael J. Giroux, Highland, MI (US)

( * ) Notice: Subject to any disclaimer, the term of this patent is extended or adjusted under 35 U.S.C. 154(b) by 185 days.

(21) Appl. No.: 15/407,895

(22) Filed: Jan. 17, 2017

Related U.S. Application Data

(60) Provisional application No. 62/278,608, filed on Jan. 14, 2016.

(51) Int. Cl.
*B60R 9/08* (2006.01)
*A63B 55/50* (2015.01)

(52) U.S. Cl.
CPC .............. *B60R 9/08* (2013.01); *A63B 55/50* (2015.10)

(58) Field of Classification Search
CPC ................................ B60R 9/08; A63B 55/50
USPC ........................................ 224/274; 248/308
See application file for complete search history.

(56) References Cited

U.S. PATENT DOCUMENTS

| | | | | |
|---|---|---|---|---|
| 5,465,930 A * | 11/1995 | Wu | .......................... | B62B 1/06 24/484 |
| 5,573,211 A * | 11/1996 | Wu | .......................... | B62B 1/06 248/230.8 |
| 5,727,642 A * | 3/1998 | Abbott | ............... | A63B 71/0009 180/6.5 |
| 5,806,738 A * | 9/1998 | D'Angelo | ................. | B60R 9/08 224/274 |
| 6,019,324 A * | 2/2000 | Wu | .......................... | B62B 1/045 224/274 |
| 6,039,227 A * | 3/2000 | Stark | ......................... | B60R 9/06 206/315.3 |
| 6,401,998 B1 * | 6/2002 | Puluso | ....................... | B62J 7/00 224/413 |
| 6,402,097 B1 * | 6/2002 | Wu | .......................... | A63B 55/00 248/98 |
| 6,554,171 B1 * | 4/2003 | Ewing, III | ............... | B60R 9/06 211/85.7 |
| 6,918,604 B2 * | 7/2005 | Liao | ........................ | A63B 55/60 280/47.26 |
| 7,350,791 B2 * | 4/2008 | Wu | .......................... | B62B 3/04 280/47.26 |
| 8,474,671 B2 * | 7/2013 | Kelly | ...................... | A63B 55/00 224/274 |
| 9,199,583 B2 * | 12/2015 | Tressel | ...................... | B60R 9/08 |
| 2005/0000987 A1 * | 1/2005 | Heidenreich | .......... | A63B 55/00 224/274 |
| 2007/0017946 A1 * | 1/2007 | Orr | ........................... | B60R 9/00 224/274 |
| 2007/0023466 A1 * | 2/2007 | Policastro | ................. | B60R 9/00 224/42.39 |
| 2007/0138820 A1 * | 6/2007 | Hanson | ..................... | B60R 9/08 296/37.14 |
| 2015/0175084 A1 * | 6/2015 | Tressel | ...................... | B60R 9/06 224/499 |

* cited by examiner

*Primary Examiner* — Justin M Larson
*Assistant Examiner* — Lester L Vanterpool

(57) ABSTRACT

A golf bag retaining device contains a closed band adapted to be fixed or attached to the rear of a golf cart. A first armature and a second armature extend rearwardly from the band on opposite sides of the band, and provide a support system for a golf bag that is secured to a belt that is looped through buckles at open ends of the first and second armature, respectively.

20 Claims, 6 Drawing Sheets

US 10,569,716 B1

GOLF BAG RETENTION DEVICE

CROSS-REFERENCE TO RELATED APPLICATIONS

This application is entitled to and claims the benefit of Provisional Patent Application Ser. No. 62/278,608, filed on Jan. 14, 2016, the specification of which is herein incorporated by reference as if fully stated.

BACKGROUND OF THE INVENTION

The present invention relates to a harness or carrier for a golf bag and its contents. Golfing has become a major source of entertainment. With the popularity of golf, many improvements in the equipment are currently being developed. For example, various devices have been developed to secure a golf bag and clubs onto the rear of a golf cart. A strap, for example, is one device that is used to retain the golf bag in the cart as the golfer drives from one shot to another, and from one golf hole to another golf hole. In one known carrier or harness for golf bags, a belt is attached to a rear portion behind the seats of a golf cart. The belt is laced through hand carriers on the golf bag and then buckled to snugly fit about the golf bag. One drawback with this design is that access to the bag is somewhat limited in that it is tucked into the rear of an associated golf cart. Related thereto, the golf bag is typically stood up on end wherein the golf clubs must be raised substantially in an upward direction to remove them from the bag. Providing easier access to the golf clubs while yet retaining the golf bag in the rear of the golf cart would be an improvement in the art. Another drawback with the known design of a strap is that it does not adequately stabilize the golf bag, and may as the cart is being driven, result in the bag and/or clubs in the bag being released from the back of the golf cart. Providing a golf bag retention device that firmly stabilizes the golf bag at the rear of the golf cart would be an improvement in the art.

SUMMARY OF THE INVENTION

The present invention includes a golf bag retention device, also known as a golf carrier or harness, that is adapted to be secured to an associated golf cart. A golf bag retaining device contains a band that may be shaped as a trapezoid, a hoop, or otherwise shaped, and adapted to be fixed to a rear of the golf cart. A first armature extends from the band and is adapted to support a golf bag. A second armature extends from the band in the same direction as the first armature, and the second armature extends opposite the first armature side of the band, and also is adapted to support a golf bag. A first buckle is fixed to a first open end of the first armature and a second buckle is fixed to a second open end of the second armature. A golf bag belt is adapted to fit through each of the first and second buckles and then about an associated golf bag, for securing and stabilizing the golf bag to a rear of a golf cart.

DETAILED DESCRIPTION OF THE PRESENT INVENTION

Figure 1:
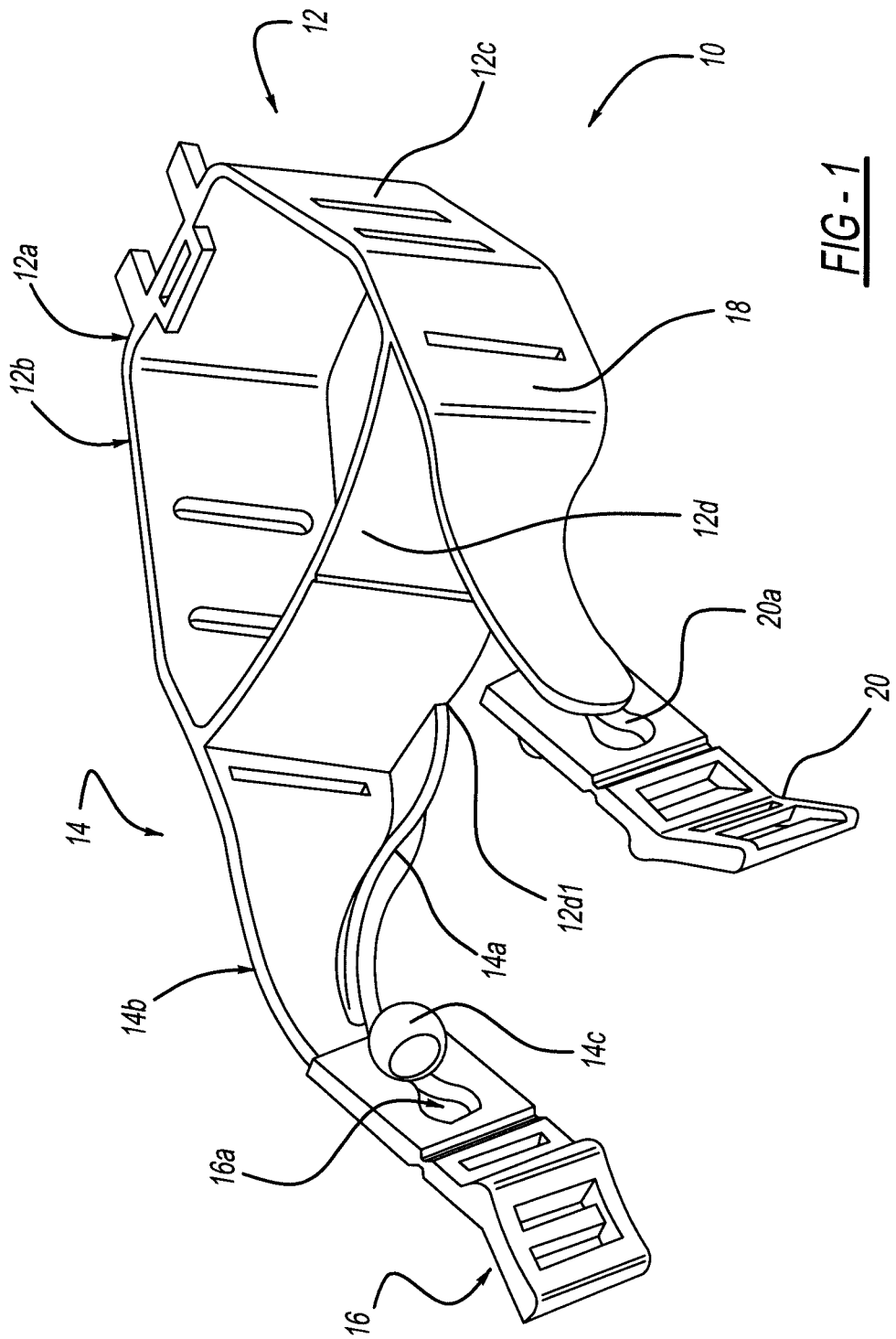
FIG. 1 exemplifies a golf bag retention device 10, that may also be referred to as a harness or carrier 10.
Figure 2:
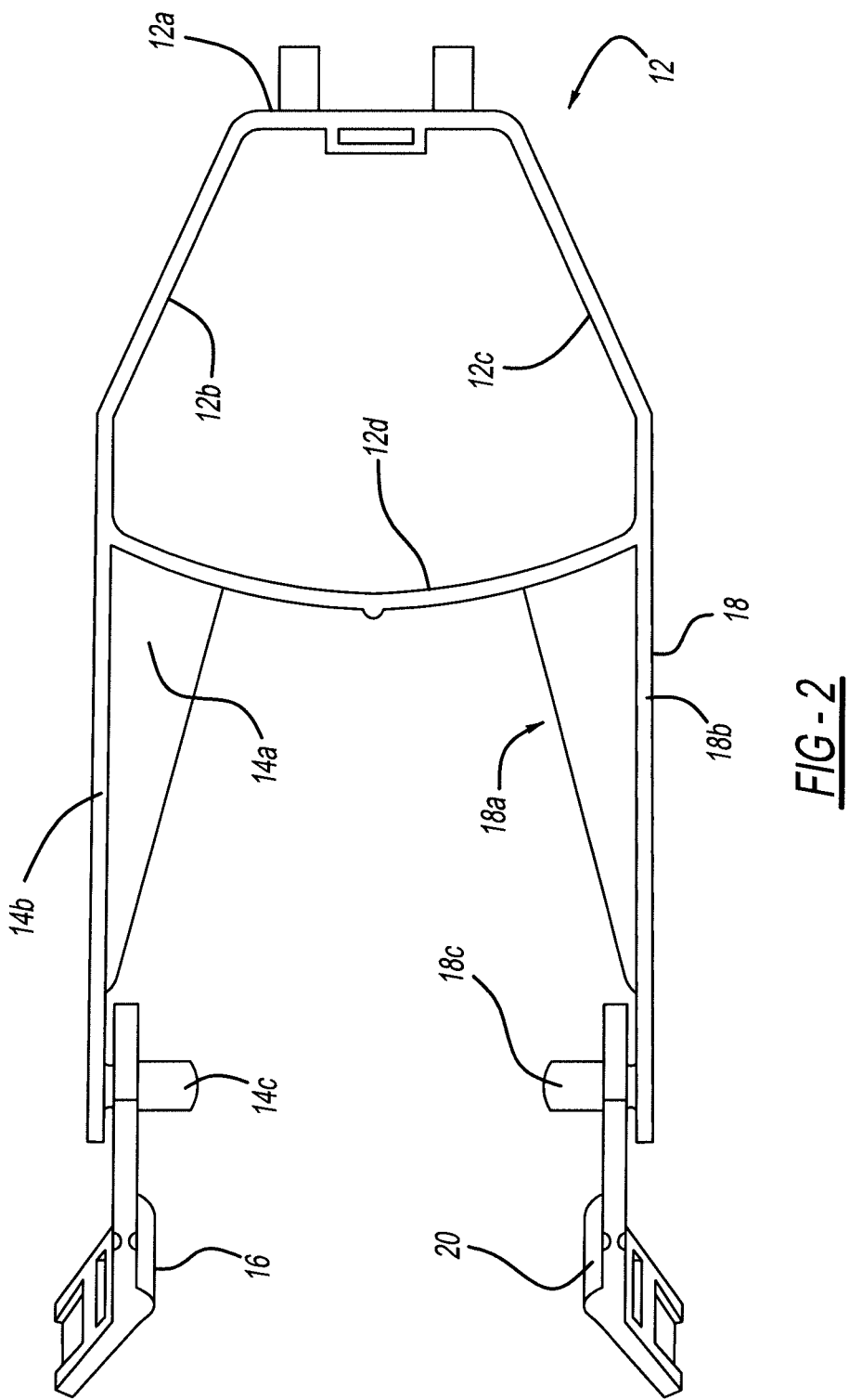
FIG. 2 exemplifies a top view of the golf bag retention device 10 of FIG. 1.
Figure 3:
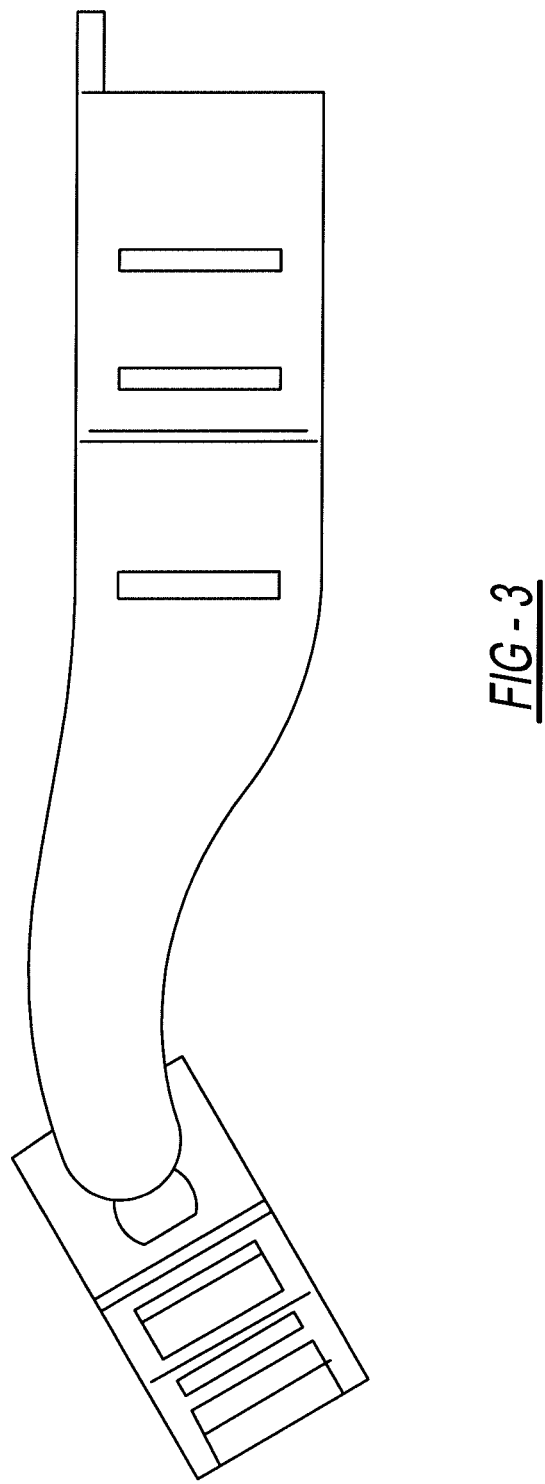
FIG. 3 exemplifies an armature or attachment member 14/18 including a buckle or connector 20.

In accordance with the present invention, and with reference to the figures, a golf bag retention device 10 contains a bracket or band 12 for securing a golf bag to a golf cart, typically the back end of the golf cart. See FIGS. 1, 5, and 6, for example. The band 12 may be made from a flexible, resilient, and/or rigid type of material. As shown in the figures, the band 12 contains a general trapezoidal form, but may be formed in other geometric shapes that hold and accommodate the exterior of a golf bag.

Figure 4:
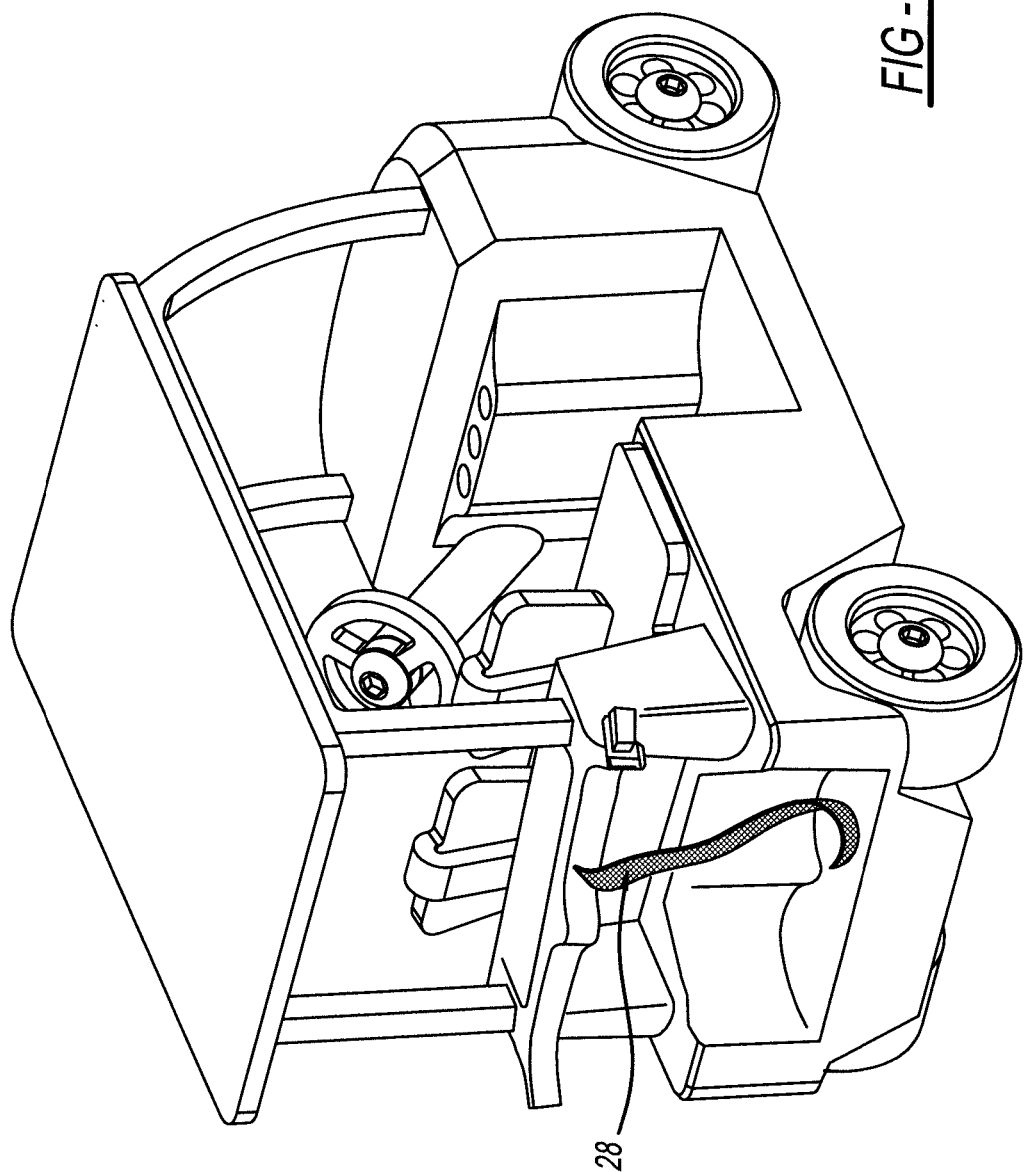
FIG. 4 exemplifies a belt 28 and an associated buckle that are typically provided on the rear of a golf cart, for securing a golf bag to the rear of the golf cart.
Figure 5:
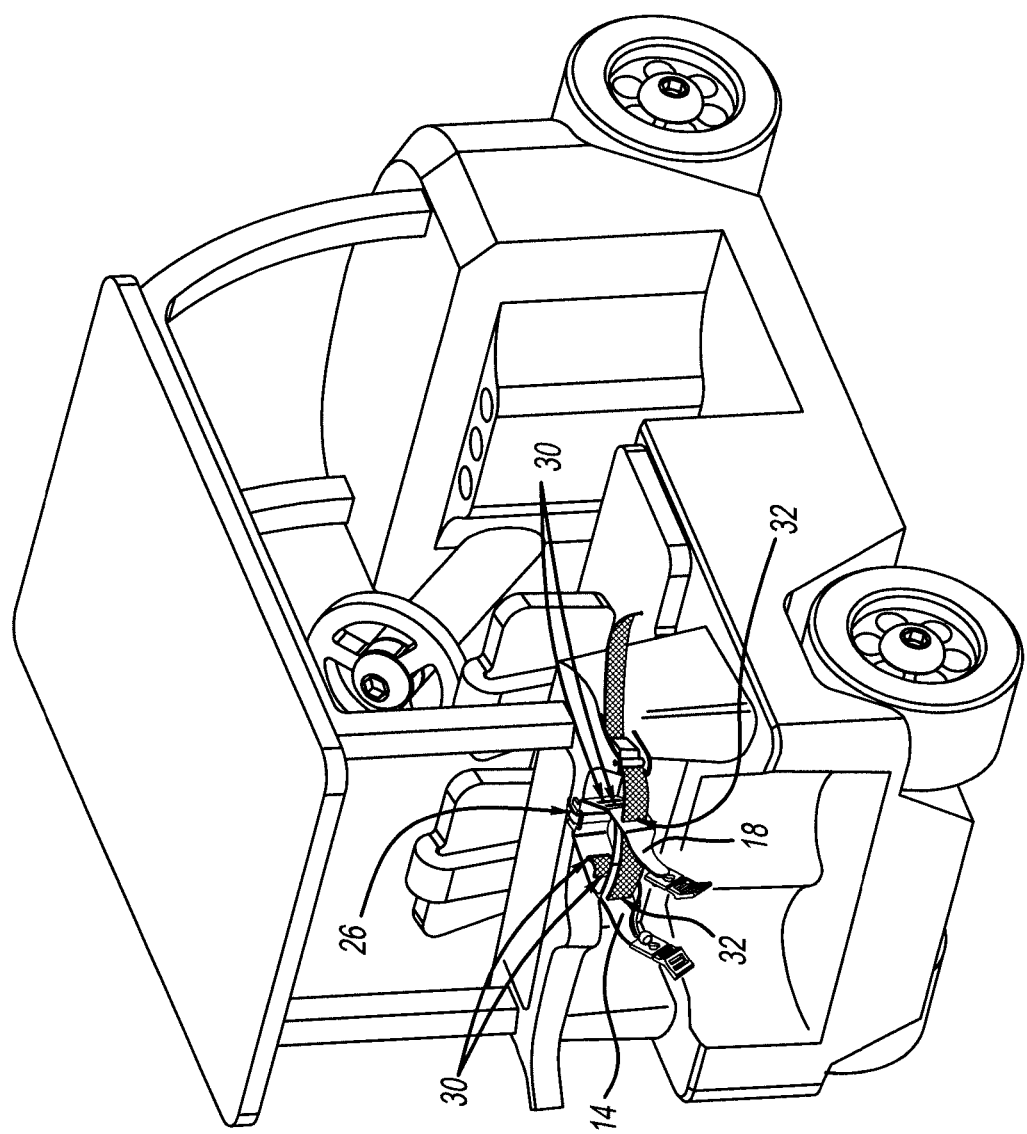
FIG. 5 exemplifies a golf retention device in accordance with the present invention, secured to the rear of the golf cart by the belt 28 normally provided at the rear of the golf cart.
Figure 6:
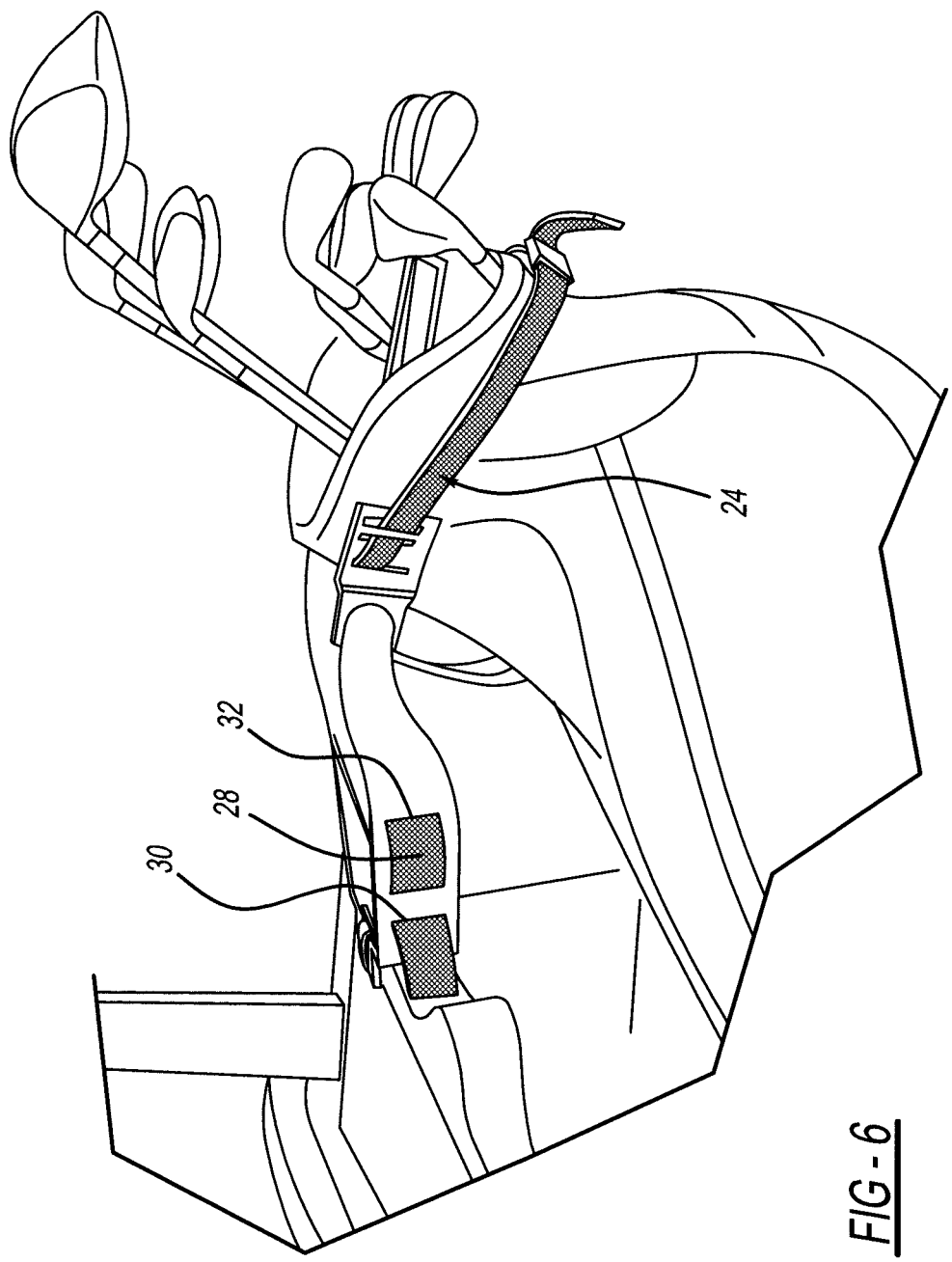
FIG. 6 exemplifies a golf retention device of the present invention, secured to the rear of the golf cart by the belt 28 normally provided at the rear of the golf cart, and, a golf bag secured to the golf retention device 10 in accordance with the present invention.

A first member 12a of band 12 may be formed in a flat profile to fit flush against a basket or back end of a golf cart, for example. A belt 26 may be attached to the back of the golf cart and also around first member 12a, thereby securing the golf device 10 to the golf cart. A second member 12b may be formed in an oblique or angled direction from the first member 12a. A third member 12c may also be formed in an oblique or angled direction from the first member 12a, wherein second member 12b and third member 12c are formed opposite to each other and angle away from each other as they extend away from the first member 12a. A fourth member 12d is formed opposite the first member 12a, and connects second member 12b with third member 12C, thereby forming the annular band 12. The band 12 is preferably made from a rigid material thereby enhancing the stability of the golf bag when attached thereto. As shown in FIGS. 4-6, a belt 28, typically provided on the rear of the golf cart for securing a golf bag, may instead be woven or routed through two or more slots 30 provided in second member 12b and/or third member 12c, and also through slots 32 formed in arms 14 and 18 if desired, then secured in the normal fashion to thereby additionally secure device 10 to the rear of the golf cart.

A first armature or attachment member 14 rearwardly extends from the second member 12b and is preferably rigidly formed. As used in this specification, the term "rearwardly" is meant to indicate that the subject constituent of the golf bag retaining device is adapted to extend rearward from the rear of an associated golf cart. As also shown in the figures, a first cross bracket 14a, preferably triangular in shape, extends from a bottom 12d1 of the fourth member 12d. A side member 14b of the armature 14, extends from the second member 12b toward the rear of the device 10, and also extends from the first cross bracket 14a. A first hook member 14c is integrally formed at a rear-most point of the side member 14b. A first connector 16 such as a buckle 16 contains a first orifice 16a for placement of the hook member 14c therethrough. The buckle or connector 16 is thereby attached to an associated belt 24 or other restraining member 24 that is fully or at least partially wrapped about the golf bag, to thereby secure the golf bag device 10 to the golf cart.

A second armature or attachment member 18 rearwardly extends from the second member 12c and is preferably rigidly formed. As also shown in the figures, a second cross bracket 18*a*, preferably triangular in shape, extends from a bottom 12*d*1 of the fourth member 12*d*. A side member 18*b* of the armature 18, extends from the third member 12*c* toward the rear of the device 10, and also extends from the second cross bracket 18*a*. A second hook member 18*c* is integrally formed at a rear-most point of the side member 18*b*. A second connector 20 such as a buckle 20 contains a second orifice 20*a* for placement of the hook member 18*c* therethrough. The buckle or connector 20 is thereby attached to an associated belt 24 or other restraining member 24 that is fully or at least partially wrapped about the golf bag, to thereby secure the golf bag device 10 to the golf cart.

When installed on a golf cart, the golf bag retention device 10 preferably provides a rigid assembly that better supports a golf bag connected thereto.

The band 12 and the connectors 16 and 20 may be injection-molded or otherwise molded if made from a rigid plastic, for example. The various members and arms of band 12 may be integrally joined in one monolithic assembly, or, if desired, may be made individually and then joined together by male and female fittings, by adhesives, or by other known methods. Belts 24, 26, and 28 may be made or sewn from a flexible material such as plastic or fabric, in a known manner.

U.S. Pat. Nos. 7,600,729, 8,910,785, and 8,662,363, and, U.S. Patent Application Pub. Nos. 20120018470, 2012126447, and 20120223112 exemplify related art, and are each herein incorporated by reference in their entireties.

It will be understood that the foregoing description of the present invention is for illustrative purposes only, and that the various structural and operational features herein disclosed are susceptible to a number of modifications, none of which departs from the scope of the present invention. The preceding description, therefore, is not meant to limit the scope of the invention, but is meant to include any equivalents that would be realized by those of ordinary skill in the art.

What is claimed is:

1. A golf bag retaining device for a golf cart comprising:
   an annular band adapted to be fixed to a rear of said golf cart;
   a first armature extending from said annular band and adapted to support a golf bag;
   a second armature extending from said annular band in the same direction as said first armature, said second armature extending from an opposite side of said annular band;
   a first buckle fixed to a first open end of said first armature;
   a second buckle fixed to a second open end of said second armature; and
   a belt that is adapted to fit through each of said first and second buckles and about an associated golf bag, for securing said golf bag,
   wherein said annular band contains a frontal slot that is adapted to receive a belt for securing a frontal portion of said annular band to the golf cart.

2. The golf bag retaining device of claim 1 further comprising at least two slots in said annular band, said slots adapted to receive a rear golf cart belt for fixing said annular band to said golf cart.

3. The golf bag retaining device of claim 1 further comprising a first slot in said first armature and a second slot in said second armature, said first and second slots adapted to receive a rear golf cart belt for fixing said annular band to said golf cart.

4. The golf bag retaining device of claim 1 wherein said first armature comprises a first side member extending from an outer portion of said annular band, and, a first cross bracket extending from said annular band at a point between said first and second armatures, to the first side member.

5. The golf bag retaining device of claim 4 wherein said second armature comprises a second side member extending from an outer portion of said annular band opposite said first side member, and, a second cross bracket extending from said annular band at a point between said first and second armatures, to the second side member.

6. The golf bag retaining device of claim 1 wherein said annular band is trapezoidal in shape.

7. The golf bag retaining device of claim 1 wherein said annular band is shaped as a hoop.

8. The golf bag retaining device of claim 1 wherein said annular band contains a pair of prongs on said frontal portion for biasing said frontal portion against the golf cart.

9. A golf bag retaining device for a golf cart comprising:
   an annular band adapted to be fixed to a rear of said golf cart;
   a first armature extending from said annular band and adapted to support a golf bag;
   a second armature extending from said annular band in the same direction as said first armature, said second armature extending from an opposite side of said annular band;
   a first cross bracket extending from said annular band at a point between said first and second armatures to said first armature;
   a second cross bracket extending from said annular band at a point between said first and second armatures to said second armature;
   a first buckle fixed to a first open end of said first armature;
   a second buckle fixed to a second open end of said second armature; and
   a first belt that is adapted to fit through each of said first and second buckles and about an associated golf bag, for securing said golf bag.

10. The golf bag retaining device of claim 9 wherein said first and second cross brackets are triangular in shape.

11. The golf bag retaining device of claim 9 wherein said first and second armatures each narrow in width from said band to said first and second open ends, respectively.

12. The golf bag retaining device of claim 9 wherein said band contains a frontal portion, a first side portion extending from said frontal portion and connected to said first armature, a second side portion extending from said frontal portion and connected to said second armature, and, a rear portion connected to said first side portion and said second side portion.

13. The golf bag retaining device of claim 12 wherein said frontal portion contains a pair of slots for receiving a second belt therethrough, for fastening said frontal portion to said golf cart.

14. The golf bag retaining device of claim 13 wherein said first side portion contains a second pair of slots and said second side portion contains a third pair of slots, said second and third pairs of slots adapted to receive a third belt from the rear of the golf cart, thereby further fixing said band to said golf cart.

15. The golf bag retaining device of claim 14 wherein said first armature contains a fourth pair of slots and said second armature contains a fifth pair of slots, said fourth and fifth pair of slots also adapted to receive said third belt, thereby further fixing said band to said golf cart.

16. The golf bag retaining device of claim 15 wherein said golf bag retaining device is formed from a rigid material.

17. A golf bag retaining device for a golf cart comprising:
a band adapted to be fixed to a rear of said golf cart, said band comprising at least two slots, said slots adapted to receive a rear golf cart belt for fixing said band to said golf cart;
a first armature extending from said band and adapted to support a golf bag;
a second armature extending from said band in the same direction as said first armature, said second armature extending from an opposite side of said band;
a first buckle fixed to a first open end of said first armature;
a second buckle fixed to a second open end of said second armature; and
a second belt that is adapted to fit through each of said first and second buckles and about an associated golf bag, for securing said golf bag.

18. A golf bag retaining device for a golf cart comprising:
a band adapted to be fixed to a rear of said golf cart;
a first armature extending from said band and adapted to support a golf bag, said first armature comprising a first side member extending from an outer portion of said band;
a first cross bracket extending from said band at a point between said first and second armatures to the first side member;
a second armature extending from said band in the same direction as said first armature, said second armature extending from an opposite side of said band;
a first buckle fixed to a first open end of said first armature;
a second buckle fixed to a second open end of said second armature; and
a belt that is adapted to fit through each of said first and second buckles and about an associated golf bag, for securing said golf bag.

19. The golf bag retaining device of claim 18 wherein said second armature comprises a second side member extending from an outer portion of said band opposite said first side member, and, a second cross bracket extending from said band at a point between said first and second armatures, to the second side member.

20. A golf bag retaining device for a golf cart comprising:
a band adapted to be fixed to a rear of said golf cart, said band containing a frontal slot that is adapted to receive a belt for securing a frontal portion of said band to the golf cart;
a pair of prongs integral to said frontal portion for biasing the frontal portion to said golf cart;
a first armature extending from said band and adapted to support a golf bag;
a second armature extending from said band in the same direction as said first armature, said second armature extending from an opposite side of said band;
a first buckle fixed to a first open end of said first armature;
a second buckle fixed to a second open end of said second armature; and
a belt that is adapted to fit through each of said first and second buckles and about an associated golf bag, for securing said golf bag.

\* \* \* \* \*